United States Patent [19]

Urai

[11] 3,938,771

[45] Feb. 17, 1976

[54] SEAT ADJUSTER

[75] Inventor: Muneharu Urai, Higashiyamato, Japan

[73] Assignee: Takeji Saito, Musashino, Japan

[22] Filed: July 19, 1974

[21] Appl. No.: 489,501

[52] U.S. Cl. ............................... 248/429; 297/346
[51] Int. Cl.² ........................................ A47B 7/00
[58] Field of Search ........... 248/429, 424, 420, 430, 248/393; 297/346; 108/83; 308/3.6

[56] References Cited
UNITED STATES PATENTS

| | | | |
|---|---|---|---|
| 2,877,824 | 3/1959 | Huttisch | 248/429 |
| 3,215,475 | 11/1965 | Manson | 308/3.6 |
| 3,259,354 | 7/1966 | Dall | 248/429 |
| 3,637,268 | 1/1972 | Walter | 108/83 X |
| 3,851,846 | 12/1974 | Long | 248/188.2 |

FOREIGN PATENTS OR APPLICATIONS

| | | | |
|---|---|---|---|
| 261,460 | 11/1926 | United Kingdom | 248/429 |
| 320,888 | 10/1929 | United Kingdom | 248/429 |
| 434,983 | 9/1935 | United Kingdom | 248/429 |

*Primary Examiner*—Roy D. Frazier
*Assistant Examiner*—Robert W. Gibson, Jr.
*Attorney, Agent, or Firm*—Oldham & Oldham Co.

[57] ABSTRACT

A seat adjuster in which a seat frame supporting a seat body is provided with a pair of flanges extending inwardly from the opposite side walls thereof, and a channel of suitable sectional shape is formed on each of these flanges to slidably receive therein a bar of complementary sectional shape supported on the floor surface of a vehicle so that the seat frame can make sliding movement along the bars. This seat adjuster can be mounted without requiring any substantial space between the seat frame and the floor surface.

8 Claims, 11 Drawing Figures

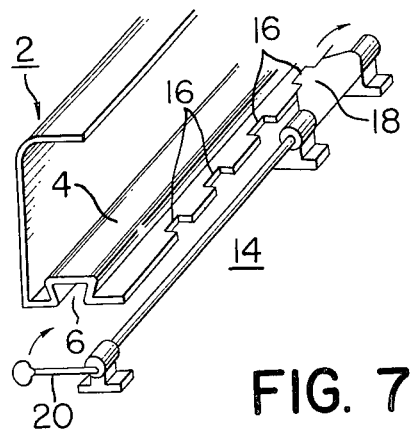
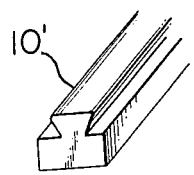
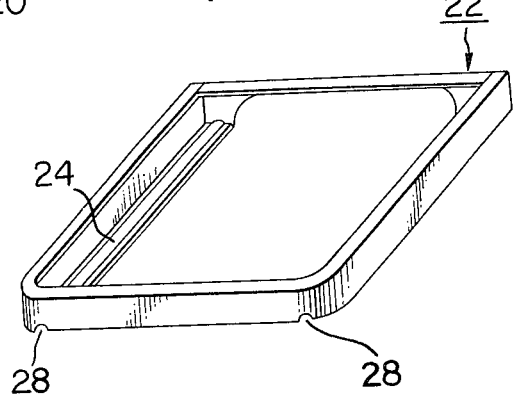
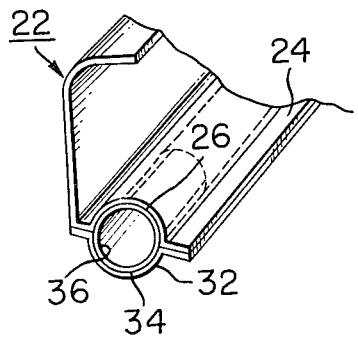

SEAT ADJUSTER

This invention relates to a seat adjuster which is a device for adjusting the position of a seat in the longitudinal direction of a vehicle or the like.

Various types of seat adjusters have been proposed hitherto and a so-called sliding rail unit as shown in FIG. 1 has generally been used in these prior art seat adjusters. This sliding rail unit comprises a slider 02 of any suitable sectional shape and a slider receiving member 04 having a slot along which the slider 02 can make free sliding movement. According to the prior art practice, one of the slider 02 and slider receiving member 04 has been secured to the seat by means of bolts and nuts or by any other suitable anchoring means, while the other has been secured to the floor surface of a vehicle or the like by similar anchoring means. In FIG. 1, the bolts are only illustrated by the reference numeral 06. Suitable openings or cutouts (not shown) have been formed in the slider 02 and slider receiving member 04, and a suitable locking means such as a locking pin engageable with these openings or cutouts has been provided for locking the slider 02 in a desired position while preventing sliding movement of the slider 02 relative to the slider receiving member 04. Various other locking means have been proposed for locking the slider 02 against sliding movement relative to the slider receiving member 04. Further, the slider 02 and slider receiving member 04 of various other sectional shapes have also been proposed in addition to those illustrated in FIG. 1.

However, in the prior art seat adjuster using such a sliding rail unit, a space for laying the sliding rail unit has been inevitably required beneath the seat, that is, between the seat frame and the floor surface. This has been disadvantageous for the seat for a vehicle in which the shock absorbing means, reclining means and other necessary means must be additionally provided for the seat. Further, a lot of costs and labors have been required for the manufacture and mounting of the sliding rail unit.

With a view to obviate various defects of the prior art seat adjuster as pointed out above, it is a primary object of the present invention to provide a novel and useful seat adjuster which can be mounted without requiring any substantial space between the seat and the floor surface, which can be very easily manufactured at lower costs and which can remarkably improve the efficiency of fabrication.

The seat adjuster according to the present invention is featured by the fact that the opposite side walls of a seat frame supporting a seat body are bent inwardly at the lower end portion thereof to form a pair of opposite flanges each having a suitable means for slidably receiving therein a bar of suitable sectional shape so that the seat frame can make free sliding movement along these bars which are disposed on the floor surface.

Therefore, the seat adjuster according to the present invention is mechanically very strong due to the fact that the bar engaging means are integrally formed with the seat frame itself. (In the prior art structure in which the slider or slider receiving member has been bolted, welded or otherwise secured to the seat frame, impartation of an abrupt impact to the seat has frequently resulted in breaking of the bolts or disruption of the welds.) Further, according to the present invention, the bar engaging means can be formed integrally with the seat frame by means such as a press. Thus, it is utterly unnecessary to make the slider receiving member separately from the seat frame and the troublesome work for securing the slider receiving member to the seat frame by bolting or welding can be eliminated. Therefore, the efficiency of fabrication can be remarkably improved and the manufacturing costs can be greatly reduced.

Furthermore, the seat adjuster according to the present invention can be mounted without requiring any substantial space between the seat frame and the floor surface so that the seat can be located in a lower position than hitherto.

According to another feature of the present invention, a reinforcing member having a sectional shape complementary to the sectional shape of a portion of the bar is fixed to the bar engaging means formed on each of the flanges of the seat frame for reinforcing the corresponding flange portions so that the sliding engagement between the bar and the bar engaging means can be reliably maintained even when an abrupt impact may be imparted to the seat.

According to still another feature of the present invention, the bar engaging means are formed by upwardly and downwardly curving alternately portions of each of the flanges, and each bar is inserted in the channel defined between these alternately upwardly and downwardly curved portions so that the seat frame having such bar engaging means formed integrally therewith can make sliding movement along the bars. According to this feature of the present invention, mechanically strong bar engaging means can be very simply formed.

According to yet another feature of the present invention, the bars are rotatably mounted on the floor surface and have an externally threaded portion, and a bearing member having an internally threaded portion for threaded engagement with the externally threaded portion of each of the bars is secured to the bar engaging means so that the position of the seat frame can be adjusted by causing rotation of the bars.

The above and other objects, features and advantages of the present invention will be apparent from the following detailed description of preferred embodiments thereof taken in conjunction with the accompanying drawings, in which:

FIG. 5 is a perspective view of one form of locking means preferably employed in the seat adjuster;

FIG. 6 is a perspective view of a part of a modification of the bar shown in FIG. 3;

FIG. 7 is a perspective view of another embodiment of the seat frame;

FIG. 8 is an enlarged section of parts of the seat frame shown in FIG. 7;

Preferred embodiments of the present invention will now be described in detail with reference to FIGS. 2 to 11.

Figure 1:
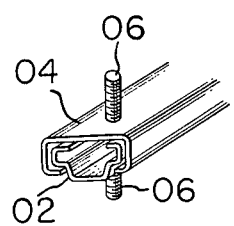
FIG. 1 is a perspective view of parts of a sliding rail unit employed in a prior art seat adjuster.
Figure 2:
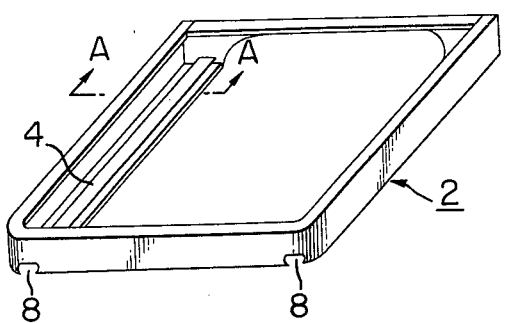
FIG. 2 is a perspective view of an embodiment of the seat frame employed in the seat adjuster according to the present invention.

Referring to FIG. 2, a seat frame preferably employed in the present invention is generally designated by the reference numeral 2. Seat springs are commonly fixed at their lower end to the upper surface of the seat frame 2 so that the seat can be bodily supported on the seat frame 2.

The opposite side walls of the seat frame 2 are bent inwardly at the lower end portion thereof to form a pair of opposite flanges 4 although only one of them is shown in FIG. 2. During shaping the seat frame 2 by shaping means such as a press, a channel 6 which is substantially in the form of an inverted trapezoid is formed in each of these flanges 4. These channels 6 extend in parallel with the side walls of the seat frame 2 and have a sectional shape as clearly shown in FIG. 3. Further, two pairs of cutouts 8 of substantially inverted trapezoidal shape are formed at the lower end of the front and back walls of the seat frame 2 in such a position that these cutouts 8 are continuous with the channels 6 as shown in FIG. 2.

Figure 3:
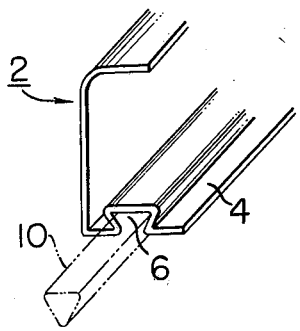
FIG. 3 is an enlarged section taken on the line A—A in FIG. 2.
Figure 4:
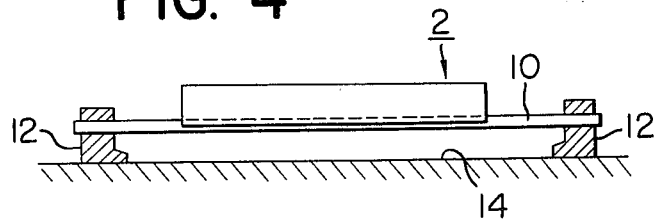
FIG. 4 is a vertical section showing the state in which the seat frame shown in FIG. 2 is mounted on bars.

A bar 10 having a substantially triangular shape as shown by the imaginary lines in FIG. 3 is partly received in each of the channels 6 in the seat frame 2 formed in the manner above described. These bars 10 may be of steel material or any other suitable hard material and are secured at opposite ends thereof to the floor surface 14 of a vehicle or the like by a pair of supporting members 12 as shown in FIG. 4. Thus, the seat frame 2 is mounted on the two bars 10 with the channels 6 engaging with the upper portion of the bars 10 which are secured to the floor surface 14 at the opposite ends thereof.

In the state shown in FIG. 4, the seat frame 2 can make free sliding movement on the bars 10. A locking means as shown in FIG. 5 may be used to lock this seat frame 2 in a desired position. This locking means comprises a plurality of suitably spaced cutouts 16 formed in the inner end of one of the flanges 4, and a locking member 18 engageable with any desired one of these cutouts 16. This locking member 18 is swingably mounted by any suitable means on the floor surface 14 and is connected to a lever 20 whose handle is disposed at a position adjacent to the seat in the vehicle so that the locking member 18 can be manipulated by the lever 20. The locking member 18 is normally urged by a spring (not shown) toward the position in which it engages with one of the cutouts 16.

When it is desired to adjust the position of the seat in the longitudinal direction of the vehicle, the lever 20 is swung in a direction as shown by the arrow in FIG. 5 to cause swinging movement of the locking member 18 in a direction as shown by the arrow so that the locking member 18 can be disengaged from the cutout 16. Then, the seat is moved to the desired position by sliding same along the bars 10. When the disengaging pressure imparted by hand to the handle of the lever 20 is released as soon as the seat is moved to the desired position, the locking member 18 is urged by the spring (not shown) to engage with another cutout 16 at the desired position. The seat may be slightly slid in the longitudinal direction when the locking member 18 fails to engage with the desired cutout 16, so that the locking member 18 can be engage with one of the cutouts 16 which is nearest to the locking member 18.

FIG. 5 illustrates merely one form of preferred locking means and any other suitable locking means may be employed in lieu of the form shown in FIG. 5. For example, a pin may be provided to engage with one of cutouts or openings formed in the flange 4 of the seat frame 2.

The bar 10 shown by the imaginary lines in FIG. 3 may be replaced by another bar 10' having a sectional shape as shown in FIG. 6. In this case, this bar 10' need not be secured to the floor surface 14 by the supporting members 12 shown in FIG. 4 and may be directly secured at the bottom surface thereof to the floor surface 14 or to a stationary part similar to the floor surface.

FIG. 7 shows another embodiment of the seat frame preferably employed in the seat adjuster according to the present invention. Referring to FIG. 7, a seat frame generally designated by the reference numeral 22 comprises a pair of inwardly extending flanges 24 similar to those shown in FIGS. 2 and 3 although only one of them is also shown in FIG. 7. Each flange 24 is bent in an arcuate fashion at the central portion thereof to form a channel 26 having a semicircular sectional shape as shown in FIG. 8. Two pairs of cutouts 28 of semicircular shape are formed at the lower end of the front and back walls of the seat frame 22 in such a position that these cutouts 28 are continuous with the channels 26 as shown in FIG. 7.

In the embodiment shown in FIGS. 7 and 8, a reinforcing member 32 is fixed to the lower surface of each of the flanges 24. This reinforcing member 32 has a semicircular channel 34 which cooperates with the channel 26 of the flange 24 to form a channel of circular cross section. A bush 36 may be fitted in this circular channel at each end portion or at any other suitable portions of the circular channel as seen in FIG. 8 so that a bar of circular or annular cross section (not shown) can be received in each of the circular channels while being supported by these bushes 36. Although not shown, these bars, are secured to the floor surface by supporting means similar to the supporting members 12 supporting the bars 10 shown in FIG. 4. It will thus be seen that, in the embodiment shown in FIGS. 7 and 8, each flange 24 and the associated reinforcing member 32 cooperate with each other to reliably hold the bar therebetween so that the bars are difficult to disengaged from the seat frame supporting position even when an abrupt impact is imparted to the seat. Although the reinforcing member 32 in FIGS 7 and 8 is shown extending over the entire length of each flange 24, this member 32 may be disposed solely at each end portion or at any other suitable position of the flange 24. Further, the reinforcing member can be attached to the upper surface of the flange so that the lower surface portion of the bar may be borne by the flange and the upper surface portion of the bar may be borne by the reinforcing member and the edge portions of the cutouts 28 formed at the lower end of the side walls of the seat frame. Furthermore, the channels 26 and 34 of the flange 24 and reinforcing member 32 may have various other shapes depending on the shape of the bar, and the bar may also have any other sectional shape including a solid or hollow cylindrical shape. A locking means similar to that shown in FIG. 5 may be provided in this second embodiment.

Figure 9:
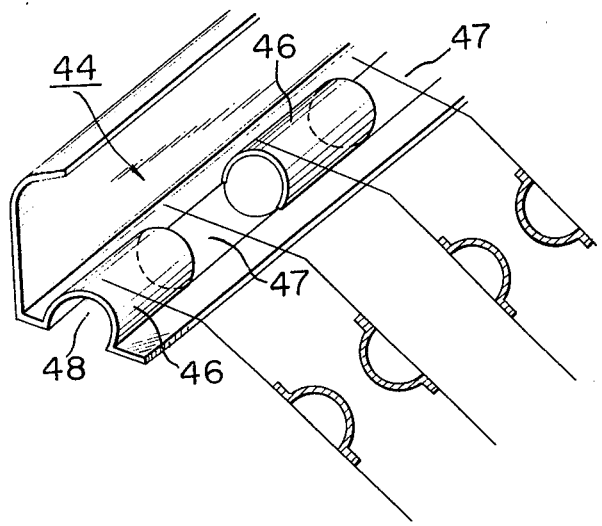
FIG. 9 is a perspective view of still another embodiment of the present invention and shows also sectional shapes of various parts of the seat frame.

FIG. 9 shows a further embodiment of the present invention. Referring to FIG. 9, a seat frame comprises a pair of inwardly extending flanges 44 each of which is similar to that shown in FIG. 7.

Each flange 44 includes a plurality of upwardly curved portions 46 of semicircular shape and a plurality of downwardly curved portions 47 of semicircular shape, and these portions 46 and 47 are alternately disposed to define therebetween a channel 48 as seen in FIG. 9. A bar having a solid or hollow cylindrical shape is passed through each of these channels so that the seat frame can make sliding movement along these bars. The sectional shapes of the portions 46 and 47 in the flange 44 are shown on the righthand side of FIG. 9.

The structure shown in FIG. 9 is advantageous in that the flanges 44 including the portions 46 and 47 can be very easily formed into the illustrated shape during shaping of the seat frame by means such as a press and a high mechanical strength can be obtained due to the fact that the seat frame can be supported bodily by the bars which are engaged at its upper and lower surface portions by the corresponding surface portions of the channel 48.

Figure 10:
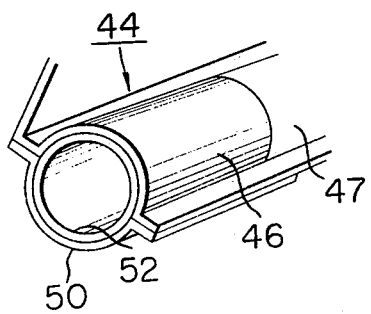
FIG. 10 is a perspective view of a partial modification of the seat frame shown in FIG. 9.

Reinforcing means as shown in FIG. 8 may be combined with the embodiment shown in FIG. 9. Referring to FIG. 10, a reinforcing member 50 is secured to the lower surface of the end portion of a flange 44 having alternate upwardly and downwardly curved portions 46 and 47 as shown in FIG. 9. This reinforcing member 50 has a channel of semicircular cross section which cooperates with the endmost upwardly curved portion 46 to define a channel 48 for receiving a bar therein. Preferably, a bush 52 may be fitted in this channel 48.

Any detailed description as to the operation of the embodiments shown in FIGS. 9 and 10 and locking means to be combined therewith will not be given herein as such is readily apparent from the detailed description given with reference to the first and second embodiments.

Figure 11:
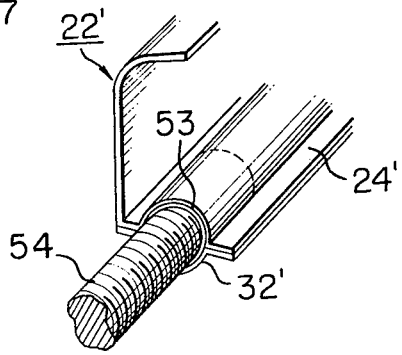
FIG. 11 is a perspective view of parts of yet another embodiment of the seat frame.

FIG. 11 shows another embodiment of the present invention. In a seat frame 22' shown in FIG. 11, a flange 24' and a reinforcing member 32' are the same as those shown in FIGS. 7 and 8, but the bush 36 shown in FIG. 8 is replaced by an internally threaded bearing member 53. Such a bearing member 53 is fixed at each end portion or at any other suitable positions of the flange 24'. A solid cylindrical bar 54 is externally threaded so that it can make threaded engagement with the internally threaded portion of the bearing member 53. A pair of such bars 54 are rotatably supported on the floor surface and are adapted to be rotated by a suitable drive means (not shown). Thus, in the embodiment shown in FIG. 11, the longitudinal position of the seat can be adjusted by causing rotation of the bars 54 by the drive means (not shown) without separately providing a locking means as shown in FIG. 5. The bars 54 which are disposed on opposite sides of the seat may be driven in interlocking relation through an interlocking means such as a gear train or chain.

What is claimed is:

1. A seat adjuster for use in a vehicle or the like comprising a pair of bars supported in parallel with each other on the floor surface of the vehicle, a seat frame supporting a seat body thereon and including a pair of opposite vertical side walls each having a substantially horizontal flange formed integrally therewith extending inwardly therefrom, said flanges extending the depth of the seat, and bar engaging means formed on each of said flanges, said bar engaging means having a sectional shape complementary to the sectional shape of at least a portion of each said bar, said bar engaging means engaging with said bars for allowing free sliding movement of said seat frame on said bars so that said seat frame can make sliding movement along said bars.

2. A seat adjuster as claimed in claim 1, wherein said bar engaging means comprises channel means formed integrally with said flanges by bending a portion of said flanges to a shape for slidably receiving therein said bars so that said seat frame slides along said bars, said bar engaging means extending the depth of the seat for elongate engagement with said bars.

3. A seat adjuster as claimed in claim 2 wherein said channel means extend upwardly and have a semicircular sectional shape, and said bar engaging means include a reenforcing member having a downwardly extending semicircular channel formed therein to form a channel of circular shape in section with said channel means to receive a bar and retain the seat against both upward and downward movement.

4. A seat adjuster as claimed in claim 1 further comprising reinforcing means having a sectional shape complementary to the sectional shape of another portion of said bars, said reinforcing means being secured to said bar engaging means to define therebetween a space for slidably receiving therein said bars so that said seat frame can make sliding movement along said bars.

5. A seat adjuster as claimed in claim 1, wherein said bar engaging means comprises channel means formed by upwardly and downwardly curving alternate portions of said flanges for slidably receiving therein said bars so that said seat frame can make sliding movement along said bars.

6. A seat adjuster as claimed in claim 1 wherein said bars are rotatably supported on the floor surface and are provided with an externally threaded portion, and bearing means having an internally threaded portion for threaded engagement with said externally threaded portion of said bars are secured to said bar engaging means so that the position of said seat frame can be adjusted by causing rotation of said bars.

7. A seat adjuster as claimed in claim 2 wherein said seat frame extends around the periphery of the seat, said seat frame having openings in its front and rear lower margins aligned with said bar engaging means for said bars to extend therethrough for engaging the seat with the bars.

8. A seat adjuster as in claim 7 wherein said seat frame lies in and defines a plane, at least the upper portions of said bars extending up into said seat to be above the lower surface of the seat.

* * * * *

UNITED STATES PATENT OFFICE
CERTIFICATE OF CORRECTION

PATENT NO. : 3,938,771
DATED : February 17, 1976
INVENTOR(S) : Muneharu Urai

It is certified that error appears in the above-identified patent and that said Letters Patent are hereby corrected as shown below:

Title page, left column, add:

[30]  Foreign Application Priority Data
September 14, 1973  Japanese............... 103256/73

Signed and Sealed this first Day of June 1976

[SEAL]

Attest:

RUTH C. MASON
Attesting Officer

C. MARSHALL DANN
Commissioner of Patents and Trademarks